United States Patent [19]
Goman et al.

[11] Patent Number: 5,533,326
[45] Date of Patent: Jul. 9, 1996

[54] REEL MOWER

[75] Inventors: Gerald E. Goman, Bloomington; Malachy Fay; Joel M. Dunlap, both of Eden Prairie, all of Minn.

[73] Assignee: The Toro Company, Bloomington, Minn.

[21] Appl. No.: 394,100

[22] Filed: Feb. 24, 1995

[51] Int. Cl.⁶ .................................. A01D 34/44
[52] U.S. Cl. ................................. 56/7; 56/249
[58] Field of Search ................. 56/7, 249, 294, 56/253

[56] References Cited

U.S. PATENT DOCUMENTS

| | | | |
|---|---|---|---|
| 1,556,965 | 10/1925 | Seeley | 56/7 |
| 2,204,256 | 6/1940 | Picha | 56/252 |
| 2,299,859 | 10/1942 | Speiser | 56/7 |
| 2,475,671 | 7/1949 | McCartney | 56/7 |
| 2,505,878 | 5/1950 | Blydenburgh | 56/26 |
| 2,525,047 | 10/1950 | Sawtelle et al. | 56/7 |
| 2,968,906 | 1/1961 | Grimes | 56/249 |
| 3,521,436 | 7/1970 | Venzke | 56/199 |
| 3,624,988 | 12/1971 | Aldred | 56/7 |
| 3,657,867 | 4/1972 | Efflandt et al. | 56/17.2 |
| 3,918,239 | 11/1975 | Aldred et al. | 56/7 |
| 4,080,774 | 3/1978 | Knight | 56/199 |
| 4,191,007 | 3/1980 | Check et al. | 56/199 |
| 4,769,976 | 9/1988 | Bassett et al. | 56/7 |
| 5,228,277 | 7/1993 | Smith et al. | 56/16.9 |
| 5,412,931 | 5/1995 | Reichen et al. | 56/199 |

FOREIGN PATENT DOCUMENTS

| | | | |
|---|---|---|---|
| 561484 | 8/1958 | Canada | 56/7 |
| 755800 | 8/1956 | United Kingdom | 56/7 |

OTHER PUBLICATIONS

Toro document no. 3316–547, Parts Catalog for Greenmaster® 3100–3WD Traction Unit (date unknown).

*Primary Examiner*—Terry Lee Melius
*Attorney, Agent, or Firm*—R. Lawrence Buckley

[57] ABSTRACT

One aspect of the present invention includes a traction vehicle (12); one or more reel-type cutting unit(s) (20), each supported by one or more rollers (34, 35); and a cutting unit suspension system (22) associated with each cutting unit, preferably including a ball joint (90) located generally at the same height as the cutting unit roller(s) (34, 35) and proximate the lateral mid-point of the cutting unit (20). Another aspect of the present invention relates to the use of a flexible seal member (110) which bears against a reel-type cutting unit and the lower edge of the mouth of a grass catcher (46). The flexible seal member (110) flexes to accommodate yawing of the cutting unit to minimize dribbling of grass clippings. In a preferred embodiment, when the cutting unit (20) is raised off of the turf, the cutting unit (20) initially rises independent of the grass catcher (46), and the flexible seal member (110) accommodates this relative motion by sliding along a front shield (40) of the cutting unit (20).

13 Claims, 4 Drawing Sheets

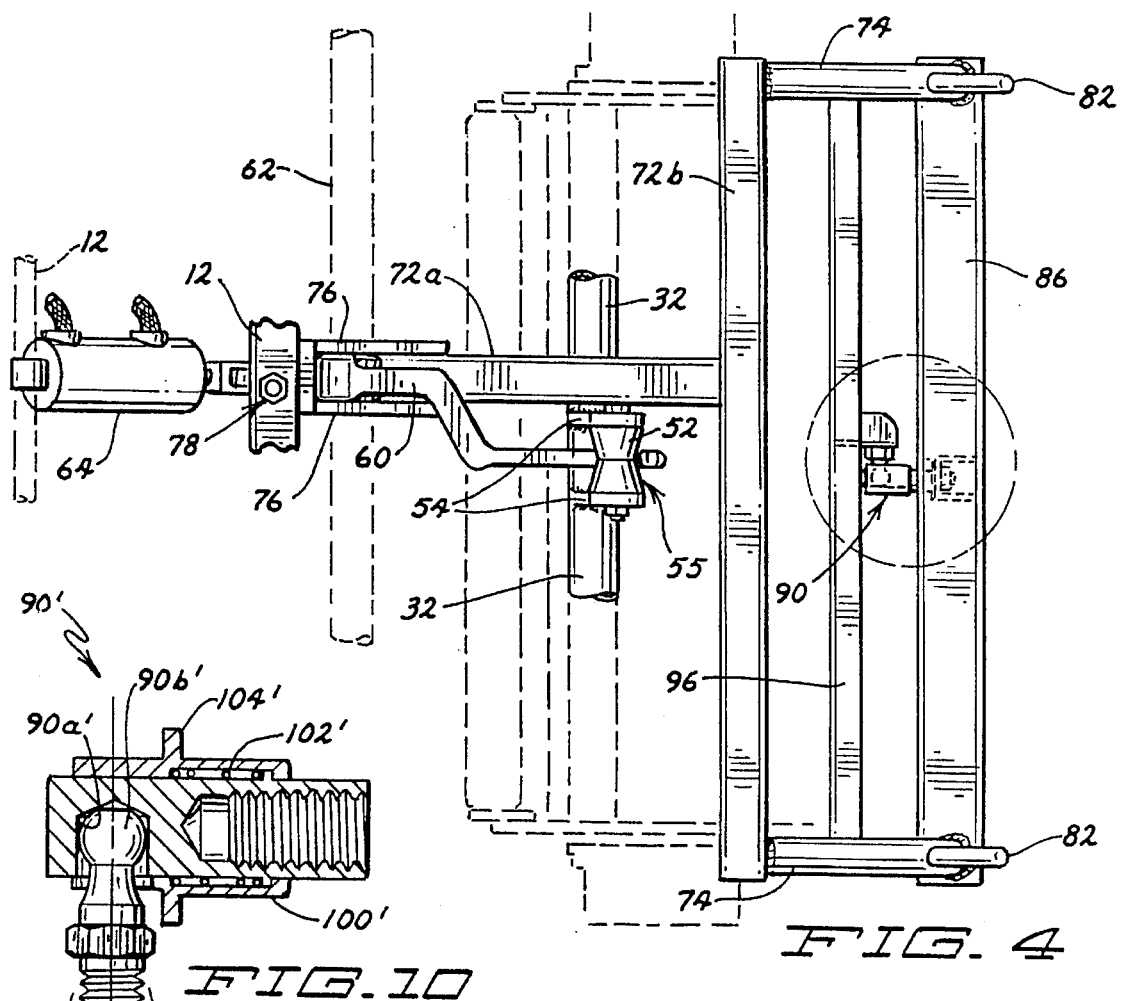
FIG. 10
FIG. 4
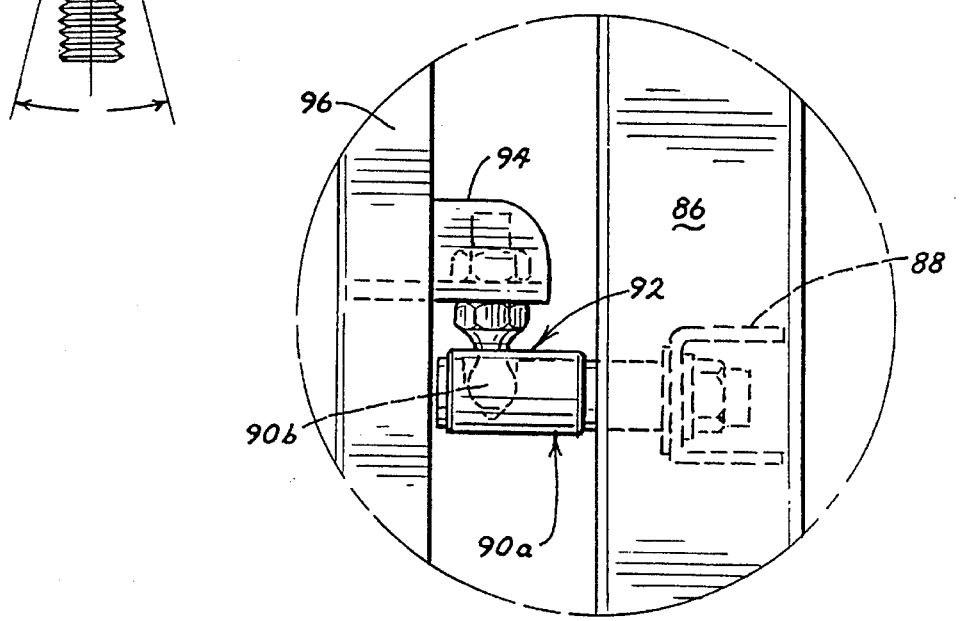
FIG. 5

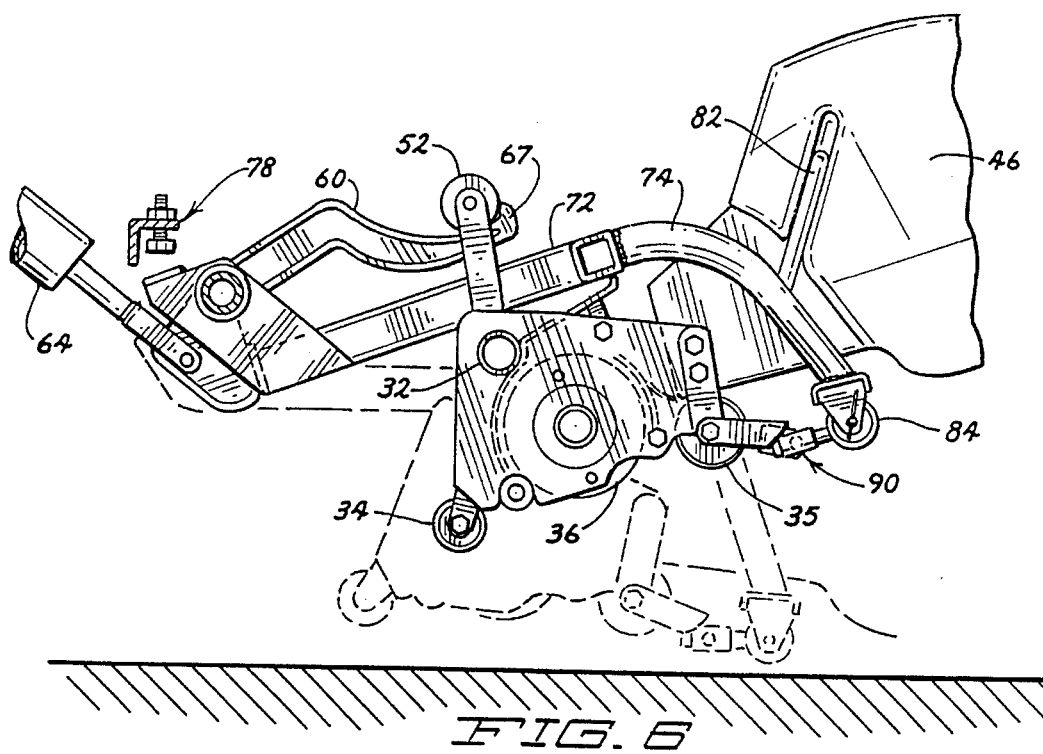
FIG. 6
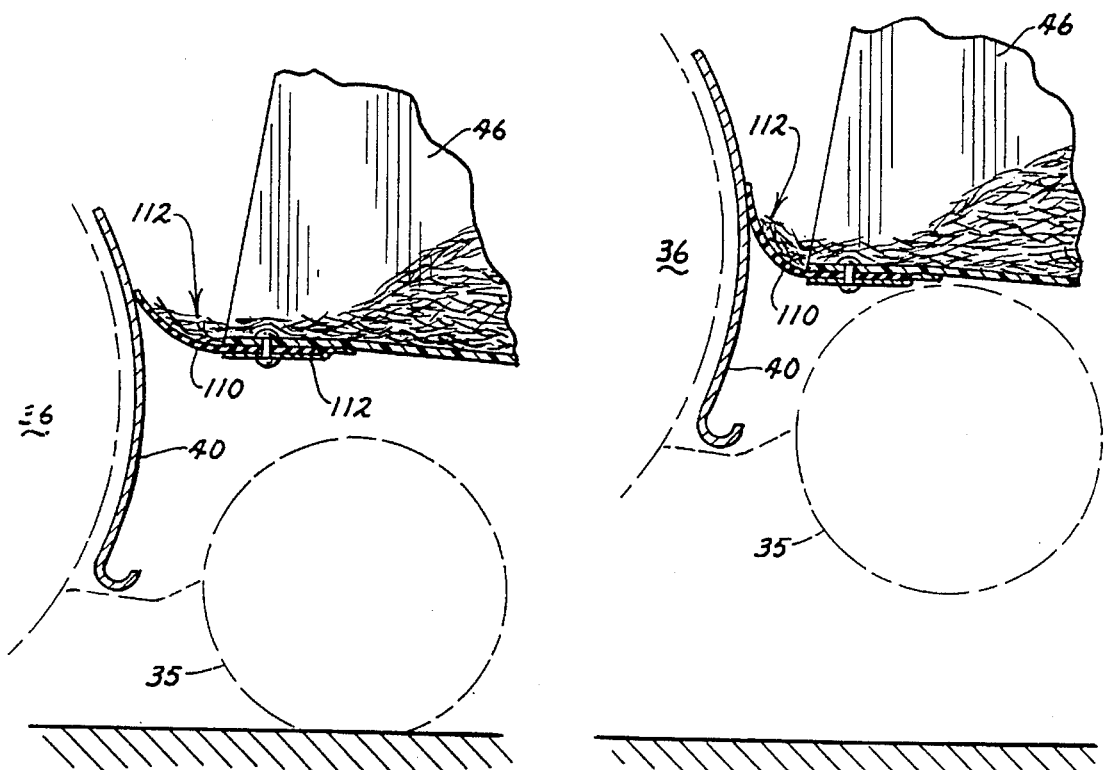
FIG. 7A
FIG. 7B

REEL MOWER

TECHNICAL FIELD

This invention relates generally to turf maintenance equipment, and more particularly to an improved reel-type turf mower.

BACKGROUND OF THE INVENTION

Many types of power turf mowing equipment are known. Such equipment can generally be classified as those mowers which include a rotary cutting unit(s) or those which include a reel cutting unit(s). A rotary cutting unit usually includes one or more rigid, generally straight, steel blades rotated within a housing about a vertical axis to sever grass or other vegetation at a predetermined height above the ground. A reel cutting unit, on the other hand, typically includes a frame within which is horizontally rotatably mounted a reel possessing a plurality of arcuate blades. The rotating reel blades pass in close proximity to a bedknife which spans the cutting unit frame parallel to the horizontal reel axis. Grass blades are sheared at the reel blade/bedknife interface.

While rotary cutting units are suitable for many purposes, it is generally perceived that reel units provide a higher quality cut. The present invention relates to reel-type turf mowers, and the remainder of this discussion will focus on same. As is well known, another reel-like unit is used to produce a "verticut," and this type of cutting unit is also contemplated.

Power turf mowing equipment can also be categorized based on the method of propelling the cutting units. Generally, there are walk-behind, riding, and towed turf mowers. The present invention relates primarily though not exclusively to riding turf mowers, and for the sake of brevity the invention will hereafter be discussed in terms of commercial riding mowers having one or more reel cutting units.

Riding reel-type turf mowers typically include a traction vehicle supported by a plurality of wheels, including one or more traction wheels; a prime mover supported by the vehicle frame and connected through a transmission to the traction wheel(s); one or more reel-type cutting units, powered by the prime mover through belts or hydraulic motors, for example; and a cutting unit suspension system interposed between the cutting unit(s) and the vehicle. Some reel-type turf mowers, e.g., those intended for use on golf greens, also include grass collection systems to collect the clippings rather than allowing them to fall to the turf.

The present invention relates most directly to riding mowers of the type used in golf greens. In this type of mower, the cutting unit suspension system often includes two rather distinct subsystems, namely a lift system (often including a so-called lift arm) and a cutting unit propulsion system (often including a so-called carrier frame). The lift arm in such mowers lifts the cutting unit from its lowered, operating position but is not involved in propelling the cutting unit across the turf. Likewise, the carrier frame propels the cutting unit but is not involved in lifting the cutting unit from its operating position to its transport position. One historical problem with such mowers is that the carrier frame is usually supported at its front and by a roller that engages the turf just prior to the cutting unit, and the roller tends to compress or mat the turf thus interfering to some degree with the cutting operation.

Over the years, much effort has been directed to improving the quality of cut afforded by reel-type mowers. These efforts have been concentrated primarily in two areas, namely the cutting units themselves and the cutting unit suspension systems. The present invention relates to an improved cutting unit and grass collection system; and to a unique cutting unit suspension technique, which can collectively address any of a wide variety of long-standing problems associated with such mowers, including but not limited to "floating" the cutting unit; reducing turf matting and compaction by the carrier frame roller; and providing a good "seal" between a "floating" cutting unit and a traction vehicle supported grass catcher. Each of these particular examples of problems which can be addressed by the reel mower of the present invention is discussed below.

CUTTING UNIT FLOATING

One absolutely critical capability of reel-type riding mowers, particularly those for use on golf course greens, is to be able to cut the turf with great precision. That is, the height of cut must be extremely consistent across the entire width of the mower and there should be very few "stragglers," regardless of the terrain. This requires that the cutting unit(s) "float" relative to the traction vehicle. A truly free-floating reel unit can follow the contours or undulations of the ground irrespective of the relatively gross motion of the traction vehicle. If reel units are not supported in a floating manner, they tend to scalp the higher regions and skip over the lower regions.

The cutting unit suspension system must provide the flexibility needed to accommodate a more or less free-floating cutting unit. That is, the cutting unit suspension system must provide the necessary "degrees of freedom" to the cutting unit so that it can "float" relative to the traction vehicle. The preferred degrees of freedom, particularly for golf greens mowers, would include "rolling" (pivoting side to side about a longitudinal horizontal axis generally aligned with the direction of travel of the traction vehicle); "yawing" (pivoting about a vertical axis); and "pitching" (pivoting about a lateral horizontal axis perpendicular to a longitudinal axis), to make use of aviation terms to describe various motions of a reel-type cutting unit as it follows the turf. On reel mowers designed for use on golf greens in particular, all three degrees of freedom (i.e., pitching, rolling and yawing) are highly desirable.

Many different types of cutting unit suspension systems have been tried over the years. Most of these fail to provide a truly free-floating cutting unit. For example, U.S. Pat. No. 1,556,965 discloses a two degree of freedom system, providing only vertical desplacement and limited pivoting. Also see U.S. Pat. No. 2,525,047 which shows a mower having reel-type cutting units with only one degree-of-freedom, namely "roll".

In pursuit of still greater cutting unit floating action, "omnidirectional" three degree of freedom joints such as ball-and-socket joints have been proposed for use in cutting unit suspension systems. Ball joints, as is well known, allow almost unlimited rotary or spherical motion, and therefore would seem to offer a simple solution to the floating problem. But the issue is, how should the ball joint (or other omnidirectional joint) be employed in the cutting unit suspension to achieve the desired results?

The prior art discloses ball joints in various types of cutting unit suspension systems. For example, see U.S. Pat. No. 3,624,988, which shows the use of a central ball joint and a pair of end ball joints propelling a reel-type cutting unit. The Toro Company, assignee herein, has also used ball joints in cutting unit suspension systems. See FIGS. 8 and 9 of the present application, illustrating use of a pair of ball joints in a prior Toro mower, which readily provides "pitching" but only small amounts of "yawing" and "rolling" of the cutting unit. The cutting unit CU is pulled by a carrier frame CF. More specifically, the cutting unit CU is pulled at either end by means of a ball joint B located along the centerline of the front roller FR of cutting unit CU. The cutting unit suspension system of FIGS. 8 and 9 has been used by The Toro Company for years, and has many advantages over other suspension systems, but there are "floating" issues in connection with that system. For example, because of the fact that two ball joints are used and the relatively complex nature of the connection between the carrier frame CF and the traction vehicle, the cutting unit CU can't freely steer or yaw as it traverses the golf green. Instead, the cutting unit CU to some degree "waddles" through a turn, because the cutting unit CU cannot freely yaw without, at the same time, causing unnecessary rolling. See FIGS. 8 and 9, which show how an amount of yaw Y causes a certain amount of rolling R of the cutting unit CU. While this is a subtle problem, not noticeable in most situations, it can become an issue during relatively sharp turns, e.g., during the clean-up pass around the outer periphery of a golf green.

Applicants perceive that it is critically important to accommodate free steering or yawing of the cutting units. If the cutting units are not permitted to freely steer, then the rollers supporting the cutting unit will tend to slide laterally, i.e. skid, to some degree when the mower negotiates a turn. If a so-called Wiehle roller, one which includes a plurality of circumferential grooves along its entire length, is used in conjunction with a non-steering cutting unit, then skidding and turf scuffing is even more likely. And a cutting unit which is sliding laterally even slightly does not provide as clean a cut as a cutting unit which is accurately tracking the turn, i.e. aligned such that a lateral axis passing through the cutting reel is perpendicular to the direction of travel of the traction vehicle at any given instant in time. Thus one problem addressed by the present invention is cutting unit floating, and more particularly cutting unit floating which permits free and independent rolling, pitching and yawing.

CARRIER FRAME ROLLER

Another issue with the prior art system depicted in FIGS. 8 and 9 is that the carrier frame roller is supported at its forwardmost end by a carrier frame roller CFR. That is, the carrier frame CF is pivotally attached to the traction vehicle but much of the weight of the carrier frame CF is borne by roller CFR. This weight can become significant especially when the carrier frame CF is supporting a grass catcher. The end result is that roller CFR can tend to mat the turf just prior to the cutting operation, and the quality of cut can, in some situations, be negatively affected. The cutting unit suspension system of the present invention addresses this problem as well as the "floating" problem discussed above.

"SEAL" BETWEEN GRASS CATCHER AND CUTTING UNIT

As discussed above, an important function of a cutting unit suspension system is to "float" the cutting unit. But a floating cutting unit can create its own set of problems. For example, some reel mowers include a grass catcher. And in many high precision reel mowers used on golf courses, for example, the grass catcher is actually supported by the lift arm or carrier frame, not by the cutting unit. The theory is that the cutting unit would cut inconsistently if it had to bear the variable weight of the grass catcher (i.e., variable by virtue of the fact that the catcher becomes heavier as it becomes filled with grass clippings). In such high precision mowers, the manner in which the traction vehicle supports the cutting unit and the grass catcher must permit sufficient floating of the cutting unit, to allow it to accurately follow the ground undulations, while at the same time ensuring a good "seal" between the cutting unit and the grass catcher. Otherwise, clippings would not be efficiently collected, and an unacceptably large percentage of same would end up on the turf rather than in the grass basket.

The present invention includes a technique by which a good "seal" is maintained between the cutting unit and the grass catcher, even when the cutting unit is "floating" relative to the traction vehicle to follow ground undulations.

Thus there is a wide variety of challenges associated with suspending a high precision cutting unit from a traction vehicle. Floating the reel unit, reducing turf matting caused by the carrier frame roller, and accommodating a grass catcher are long-standing problems involved in this area. The present invention addresses these problems.

SUMMARY OF THE INVENTION

Accordingly, one embodiment of the present invention includes a traction vehicle; a reel-type cutting unit supported by a roller; and a cutting unit suspension system including a single joint member located generally at the same height as the cutting unit roller and proximate the lateral mid-point of the cutting unit.

The invention can also include a turf mower including a traction vehicle; a reel-type cutting unit and supported by a roller and including a reel having a centerline; and a cutting unit suspension system including a single cutting unit joint located below the reel centerline, the cutting unit suspension system permitting rolling, yawing and pitching of the cutting unit relative to the traction vehicle.

In a preferred embodiment, the cutting unit joint is "omnidirectional", permitting pitching, rolling and yawing of the cutting unit relative to the traction vehicle. And in a still further preferred embodiment, the cutting unit joint is a ball joint.

Another aspect of the invention is directed to a turf mower including a traction vehicle; a reel-type cutting unit; a cutting unit suspension system operatively connected to the traction vehicle and the cutting unit, wherein the suspension system permits at least yawing of the cutting unit relative to the traction vehicle; a grass catcher supported by the cutting unit suspension system, the grass catcher forming a mouth have a lower edge; and a flexible seal member bearing against the cutting unit and the lower edge of the grass catcher mouth, wherein the flexible seal member flexes to accommodate yawing of the cutting unit by maintaining contact with the cutting unit and the mouth lower edge regardless of the extent to which the cutting unit yaws.

In a preferred embodiment, the seal referred to above is fixed to the grass catcher, and includes a flexible elastomeric flap which is connected to the grass catcher mouth lower edge and which springingly bears against the cutting unit. The seal can bear against a front shield on the cutting unit.

In a still further preferred embodiment, the cutting unit suspension system includes a lift arm pivotally connected to the traction vehicle and a cutting unit carrier frame pivotally connected to the traction vehicle; the cutting unit includes a lift arm receiving means; and when the cutting unit is lifted by the lift arm operatively engaging the lift arm receiving means, the cutting unit initially rises independent of the grass catcher, and the elastomeric flap accommodates this relative motion by sliding along the cutting unit front shield.

Additional aspects of the present invention will be described with reference to the appended Drawing.

BRIEF DESCRIPTION OF THE DRAWING

FIG. 4 is a top plan view of the cutting unit suspension system of FIG. 2;

FIG. 5 is an enlarged top plan view of the portion of FIG. 4 encircled in dashed line, showing a first embodiment of a ball joint used to "float" the cutting unit;

FIG. 6 is a side elevational view of the cutting unit and cutting unit suspension system of FIG. 2, showing in solid line the cutting unit in its fully raised position and in phantom line the cutting unit in its intermediate position wherein the cutting unit but not the grass catcher is raised;

FIG. 7A shows an enlarged side elevational view of the front shield of the cutting unit of FIG. 2, and its relationship to the grass catcher and grass catcher seal element, when the cutting unit is in its lowered, operating position;

FIG. 7B is an enlarged side elevational view of the cutting unit front shield and its relationship to the grass catcher and grass catcher seal element, when the cutting unit is in its fully raised position as shown in solid line in FIG. 6;

FIG. 10 is an enlarged sectional view of a second embodiment of a ball joint that could be used in the cutting unit suspension system.

DETAILED DESCRIPTION OF THE INVENTION

Figure 1:
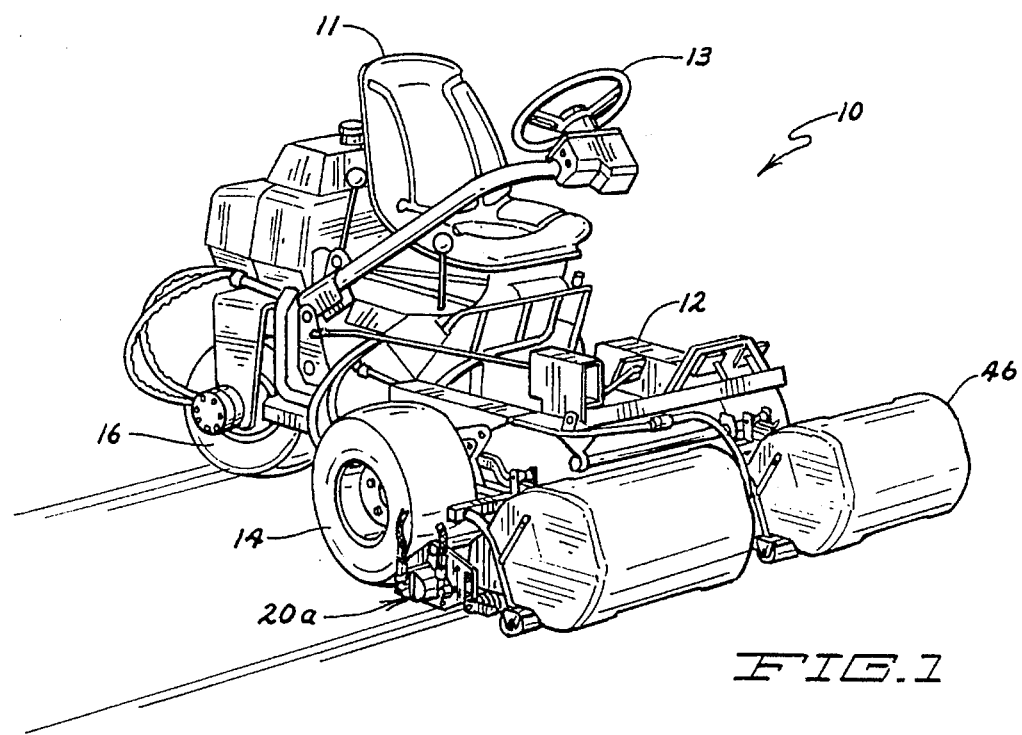
FIG. 1 is a perspective view of a turf mower according to the invention.

Referring to the Drawing, wherein like reference numerals designate like parts and assemblies throughout the several views, FIG. 1 shows a perspective view of a preferred turf maintenance machine 10 according to the invention. Machine 10 is preferably a reel-type turf mower generally of the type represented by the Greensmaster® 3100 tri-plex greens mower sold by The Toro Company, assignee herein; but those skilled in the art will appreciate that the present invention could be applied to other types of turf maintenance equipment. Mower 10 includes a traction vehicle 12 supported by a pair of front drive wheels 14 appropriately coupled through a transmission (not shown) to a prime mover (also not shown). A rear steerable wheel 16, which may or may not be powered, supports the rearward end of vehicle 12.

Turf maintenance machine 10 is, in its most preferred form, a high precision riding mower specifically intended for use on golf greens. In this embodiment, there are two front cutting units 20a spaced along a line generally perpendicular to a fore-and-aft or longitudinal axis 18 of mower 10 and directly in front of the drive wheels 14; and a single rear cutting unit 20b (not shown) roughly centered between front vehicle wheels 14 and also arranged along a line which is generally perpendicular to the longitudinal axis 18 of the mower. As known by those skilled in the art, the rear cutting unit 20b is centered between and overlaps the front cutting units 20a to handle the uncut strip of grass left by the front cutting units.

In this preferred embodiment, the front and rear cutting units 20 and related support structures are substantially identical in all pertinent respects, and therefore the "a" and "b" suffixes will not hereafter be used in most instances. In fact, in a preferred embodiment the front and rear cutting units are completely interchangeable.

In the embodiment of mower 10 shown in FIG. 1, an operator sits in an operator seat 11 and steers the traction vehicle 12 by means of a steering wheel 13 which can be manipulated to cause rear wheel 16 to pivot about a vertical axis, thereby steering the vehicle. Various levers and pedals permit the operator to control the engine speed, cutting units (on/off, raise/lower), brakes, etc. The prime mover powers one or more hydraulic pumps which provide(s) hydraulic fluid to the wheel and cutting unit motors, under control of various operator-controlled valves.

Figure 2:
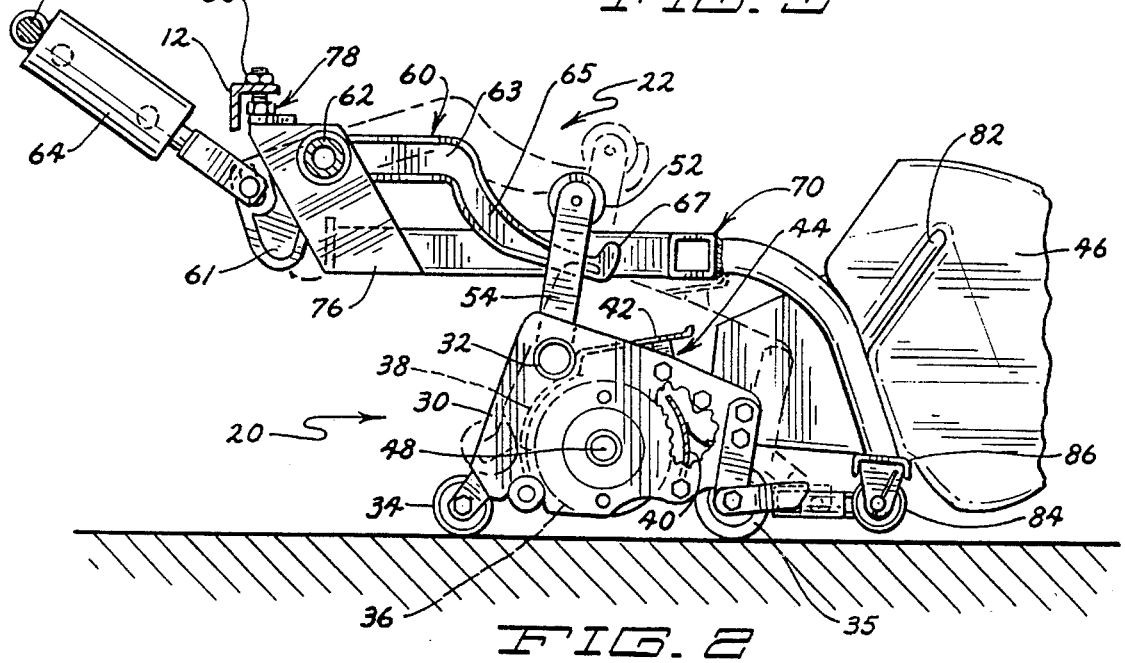
FIG. 2 is an enlarged side elevational view of the cutting unit and cutting unit suspension system of the turf mower of FIG. 1.
Figure 9:
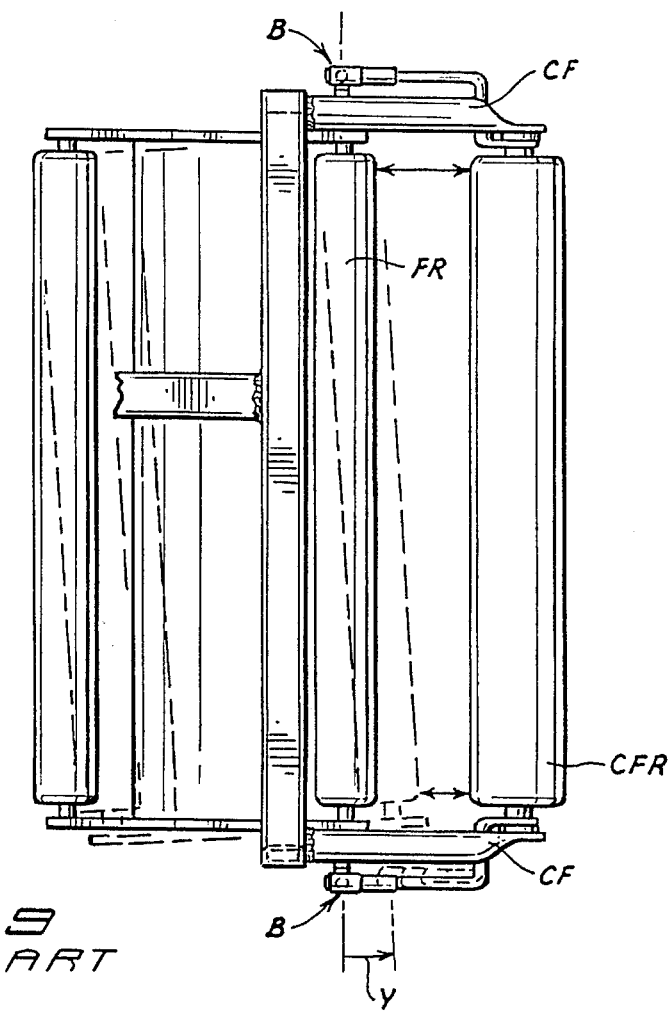
FIG. 9 is a top plain view of the prior cutting unit and cutting unit suspension system of FIG. 8.
Figure 8:
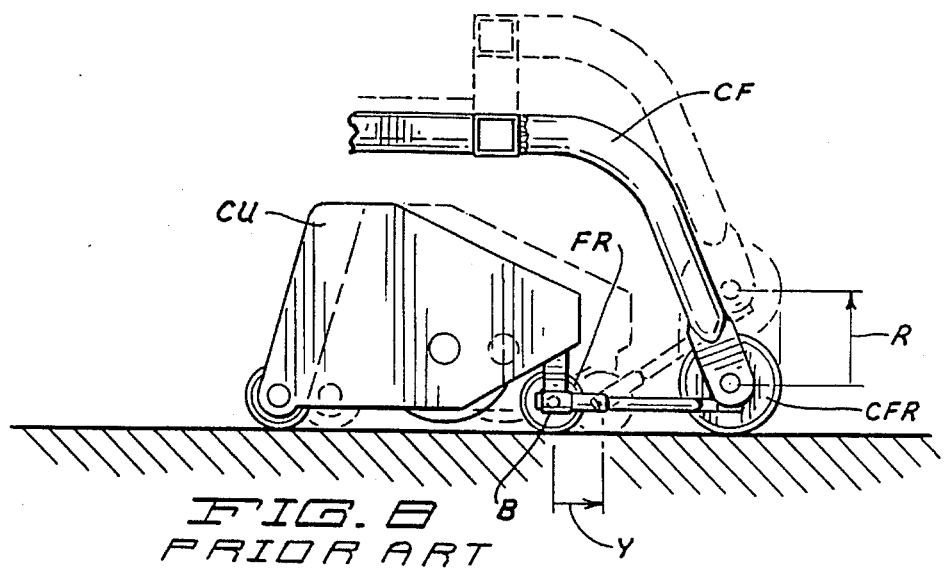
FIG. 8 is a side elevational view of a prior cutting unit and cutting unit suspension system.

An enlarged side elevational view of the left (as viewed by the operator) front reel unit 20 and a preferred cutting unit suspension system 22 are shown in FIG. 2. Although the particular construction of reel unit 20 is, for the most part, not central to the invention, the basic components of reel unit 20 will be described. A pair of generally rectangular side plates 30 are located at opposite ends of the reel unit 20. Plates 30 are spanned at the top by a steel cross tube 32 and at the bottom by a rear roller 34 and a front roller 35. The front roller 35 can be a so-called "Wiehle" roller, having a series of circumferential grooves across its entire width. Also spanning the end plates 30 is a horizontally centrally mounted rotatable reel 36 which is coupled to a hydraulic motor (not shown in FIG. 2). Thus, reel unit 20 is a substantially self-supporting unit which is pulled across the ground on rollers, the rotating cutting blade of which is powered through a hydraulic connection with the traction vehicle 12. A bedknife (not shown) also spans between end plates 30 and is situated proximate the lower outer periphery of reel 36 so that when reel 36 spins its blades come into close proximity to the bedknife to shear the grass blades.

Cutting unit 20 also includes several "shields" which help confine and direct the grass clippings during the cutting operation and thereafter. Specifically, cutting unit 20 includes a curved rear shield 38; a curved front shield 40; and a substantially planar top shield 42. All three of these shields extend across the entire width of the cutting unit 20. Rear shield 38 and top shield 42 can actually be connected to or integral with one another. Front shield 40 is a separate piece, at least in the preferred embodiment of the present invention. Shields 38, 40 and 42 are all preferably made from formed sheet metal, 16 gauge. Shields 38 and 40 preferably follow the curvature of the outer periphery of cutting reel 36, and can be spaced from the outer periphery of cutting reel 36 by about 1/16 inch.

Front shield 40 preferably has a radius of curvature of about 2.53 inches, and the cutting reel 36 has a radius of about 2.5 inches. Front shield 40 generally is concentric with cutting reel 36. The center of front shield 40 is about level with the centerline 48 of reel 36. A gap 44 between front shield 40 and top shield 42 is preferably about 2 inches, with the bottom of gap 44, formed by the top edge of front shield 40, being about level with the very top of reel 36; and the top of gap 44 being formed by top shield 42. Top shield 42 has a rearward edge located just behind the centerline 48 of reel 36; and a forward edge located just forward of the top edge of front shield 40. Top shield 42 forms an angle with the horizontal of about 5 degrees when cutting unit 20 is on level ground.

Cutting reel 36 turns clockwise, as viewed in FIG. 2. The standing grass blades are sheared off toward the bottom of the reel, at a stationary bedknife (not shown). The clippings are then carried around rear shield 38, along top shield 42, and directed through gap 44 between top shield 42 and front shield 40, and ultimately into a grass catcher 46, described further below.

Extending upwardly from cross tube 32 is a pair of substantially vertical, laterally-spaced elongate elements or straps 54, which can be welded to cross tube 32. Spanning the gap between elements 54, at the top thereof, is a roller 52 which is in the nature of a pair of truncated cones connected end-to-end, with the smaller diameter ends abutting, as shown in FIG. 4. Thus, a vertical gap or slot 55 is created, the purpose of which will be described further below. Elements 54 are preferably about 5.6 inches long (from the centerline of cross tube 32 to the centerline of roller 52) and are spaced apart about 2 inches.

The cutting unit 20 having been described in some detail, attention will now be turned to the cutting unit suspension system 22. In some turf mowers, the cutting units are propelled and lifted (from an operating position to a transport position) by means of "lift arms," one per cutting unit. While this type of "lift arm only" cutting unit suspension system is useful in many turf cutting applications, golf greens mowers typically include separate pull and pick up devices or systems. That is the case in the preferred embodiment shown in the Drawing. Specifically, there are two distinct devices pivotally attached to the frame of traction vehicle 12, a lift arm 60 for lifting and a carrier frame 70 for propelling the cutting unit.

Lift arm 60 is an iron casting which pivots about a pivot tube 62 fixed to the frame of vehicle 12. Conventional bearings/bushings can be used to reduce friction at the pivot joint. Lift arm 60 preferably includes a relatively short substantially triangularly-shaped rear portion 61 and a relatively long front portion 63 connected thereto. The horizontal through hole for pivot tube 62 is located at the point that the rear portion 61 joins the front portion 63. Front portion 63 consists of a generally horizontal rear half and a somewhat upwardly curved, somewhat downwardly extending front half forming a hook-like portion 65 in the forwardmost part of lift arm 60. An abruptly upwardly turned tip 67 prevents the cutting unit 20 from falling off of the lift arm 60 even as mower 10 is running over curbs and the like, during transport.

The hook-like portion 65 of lift arm 60 extends through vertical slot 55 created by the spaced elements 54 connected to cross tube 32. In FIG. 2, lift arm 60 is shown in its lowered, normal operating position in solid line and in the raised transport position in dashed line. A double-acting lift cylinder 64 has its cylinder pivotally connected to the frame of traction vehicle 12, and its piston or ram pivotally connected to the rear portion 61 of lift arm 60, in conventional manner. When the operator causes certain valves to open or close, this causes lift cylinder 64 to extend, thereby pivoting lift arm 60 counter-clockwise as viewed in FIG. 2. The front portion 63 of lift arm 60 moves upwardly and eventually engages roller 52, and this causes cutting unit 20 to raise off of the turf. When lift arm 60 is in its normal operating position, as shown in solid line in FIG. 2, the forward end of lift arm 60 is spaced below roller 52 by roughly 1¼ inches. Also, the preferred thickness of hook-like portion 65 of lift arm 60 is about ¾ inch, as compared to about 2 inches between elements 54. Thus, there is preferably no contact whatsoever between lift arm 60 and cutting unit 20, when cutting unit 20 is in its lowered, operating position, and cutting unit 20 can freely float relative to lift arm 60 during normal cutting operations.

In addition to the cutting unit lifting system described above, there is preferably a separate cutting unit propelling system, which is also part of the overall cutting unit suspension system 22. This propelling system, in the most preferred embodiment, includes carrier frame 70 which also pivots about pivot tube 62 fixed to the frame of traction vehicle 12. Carrier frame 70 preferably includes a substantially horizontal (when cutting unit 20 generally is on level ground) T-shaped portion 72 (see FIG. 4), and a pair of downwardly and forwardly curved portions 74 attached thereto. T-shaped portion 72 includes a longitudinal sub-portion 72a and a transverse sub-portion 72b. The rearward end of longitudinal sub-portion 72a is connected to a pair of parallelogram-shaped elements 76 which form apertures to accept pivot tube 62. The top left hand corner of parallelogram element 76 bears against a hex bolt 78 received by a threaded hole in the frame of traction vehicle 12. Hex bolt 78 can be adjusted inwardly and outwardly (upwardly and downwardly), for purposes discussed further below° A lock nut 80 secures bolt 78 in the desired position. Toward the middle of each curved portion 74, and extending upwardly and forwardly therefrom, is a "horn" 82 which supports one end of grass catcher 46 in conventional manner. Grass catcher 46 preferably carries a pair of grooves on its outer vertical sides, and these grooves accept horns 82, such that grass catcher 46 can be easily removed from the cutting unit suspension system 22 simply by grasping grass catcher 46 and vertically and forwardly withdrawing it therefrom.

Connected to the forward, lowermost tips of curved portions 74 is a cross member 86 which rotatably supports carrier frame roller 84. Roller 84, which could more generally be referred to as a type of "anti-scalping" device, does not engage the turf in the most preferred embodiment. Bolt 78 is adjusted, and locked in the preferred adjustment point by lock nut 80, so that carrier frame 70 can pivot clockwise (as shown in FIG. 2) only to the point where roller 84 is located about 1 inch off of the ground, at a preferred adjustment point. That is, the gap between the bottom of roller and the ground is preferably about 1 inch. This arrangement is in contrast to the prior art, wherein the carrier frame roller actually contacted the turf. Applicants have discovered that it is better to suspend roller 84 above the turf, so that the turf is not matted by the weight of carrier frame 70 and grass basket 46, prior to encountering the cutting unit.

Figure 3:
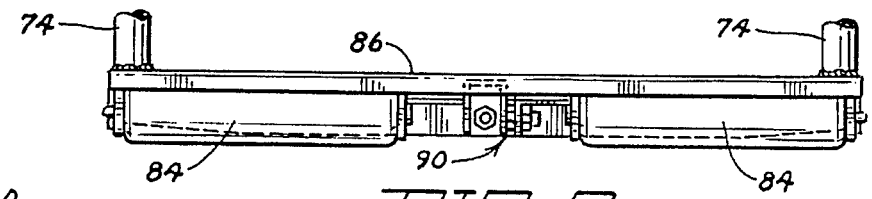
FIG. 3 is an enlarged front elevational view of a portion of the cutting unit suspension system of FIG. 2.

Roller 84 is actually a split roller, as shown in FIG. 3. That is, there is a gap between two rollers 84, located toward the lateral mid-point of cutting unit 20. Extending downwardly from cross member 86 into the gap between rollers 84 is a forwardly-opening U-shaped element 88 (shown in plan view in FIG. 5), which is preferably welded to cross member 86. Bolted to element 88 is a socket member 90a, which forms a laterally and horizontally directed opening 92 suitable for receiving a ball member 90b. Ball member 90b extends laterally and is received by socket 90a, as shown in FIGS. 4 and 5. Ball 90b is supported by an L-shaped bracket 94 which is welded or otherwise connected to a cross member 96, extending between side plates 30 of cutting unit 20. As shown in FIG. 4, ball joint 90 is preferably located at the lateral mid-point of cutting unit 20, aligned with lift arm 60.

A preferred ball joint 90' is shown in FIG. 10. The ball 90b' has a preferred diameter of about ½ inch. The socket 90a', of course, has a slightly larger diameter to establish a sliding fit. A sleeve 100' is urged toward a "ball locked" position, as shown in FIG. 10, by a compression spring 102'. Sleeve 100' can be moved to a "ball unlocked" position simply by pushing on a ring 104' attached to sleeve 100' such that sleeve 100' moves away from ball 90b' (i.e., to the right in FIG. 10). This permits easy assembly/disassembly of ball joint 90, and thus easy engagement/disengagement of cutting unit 20 from carrier frame 70. Zinc-plated steel is the preferred material for ball joint 90.

Certainly other "omnidirectional" joints could be used, and the present invention is not limited to ball joints per se. For example, in lieu of a ball joint, one could use a plurality of simple, single axis joints which would collectively function in a manner very similar to a ball joint. Although a ball joint is preferred, those skilled in the art will recognize that other types of "omnidirectional" joints or joint assemblies could be used to achieve the objectives of the present invention. And it will also be recognized that although ball joint 90 is most preferably located at the lateral mid-point of the cutting unit and roughly at the same height as the cutting unit support rollers, it needn't be so located. For example, ball joint 90 could be located higher, though preferably at or below the reel centerline.

As shown in the Drawing, particularly FIG. 2, ball joint 90 is preferably located substantially at the same height as rollers 34 and 35 of cutting unit 20. Thus cutting unit 20 is pulled from a very low point, and there is less of a tendency to compress the turf with the front roller. Also, since joint 90 is a ball joint, cutting unit 20 can freely pitch, roll and yaw relative to the carrier frame and the traction vehicle as a whole.

As noted above, in some high precision turf mowers, particularly of the type used on golf greens, grass catchers are often used. Grass catcher 46 is supported by carrier frame 70 which in turn is supported by traction vehicle 12. Thus, the weight of grass catcher 46, which varies depending on the amount of grass clippings therein, does not interfere with the three "floating" motions of the cutting unit.

A major concern is the "seal" between the cutting unit 20 and the grass catcher 46. The "seal" is a concern because cutting unit 20 must be permitted to move relative to carrier frame 70, whereas grass basket 46 is fixed to carrier frame 70. Again, grass basket 46 is carried by carrier frame 70 because it is quite heavy and is of variable weight. If grass basket 46 were supported by cutting unit 20, this would cause cutting unit 20 to have a variable weight, depending on the amount of grass clippings in grass basket 46. This would cause the quality and height of cut provided by cutting unit 20 to vary depending on the amount grass-clippings in grass basket 46, and also cause excessive compaction of the turf in some situations.

Grass basket 46 is preferably in the general nature of a box having a "mouth" which is directed rearwardly, toward cutting unit 20. The mouth has an upper edge, a pair of side edges, and a lower edge. Referring to FIGS. 7A and 7B in particular, connected to grass basket 46 proximate the lower edge of the "mouth" is a seal member 110. Seal member 110 is preferably an elastomeric flap. It can be in the nature of a single ply neoprene member having a cloth lamination and a durometer of about 65 on the SHORE A scale. Flap 110 continuously bears on the front surface of front shield 40 of cutting unit 20. Flap 110 is sufficiently resilient to maintain contact with front shield 40 even as cutting unit 20 pitches, yaw and rolls relative to grass basket 46. Flap 110 is attached to the lower, rearward edge of grass basket 46 by means of a plate 112 which is riveted to the plastic grass basket. Thus, flap 110 is substantially horizontal at the grass basket, and curves upwardly to engage front shield 40, as shown in FIGS. 7A and 7B. Grass clippings 112 are depicted in the Drawing. It can be seen that none of the grass clippings 112 fall to the turf, due to the fact that a seal is created by means of flap 110 springingly bearing on the front surface of front shield 40. Any clippings 112 which would otherwise have fallen through the gap between cutting unit 20 and grass basket 46 are caught by flap and directed into grass basket 46. Flap 110 preferably extends across the width of the entire cutting unit 20. Flap 110 is preferably about 3/32 inch thick; about 2 inches wide; and about 21 inches long. Importantly, as cutting unit 20 yaws, flap 110 flexes even more and becomes less flat and horizontal, as one corner of the cutting unit moves closer to the corresponding corner of the grass catcher; and the flap at the other end of the cutting unit actually flexes less and becomes more flat and horizontal, as the other corner of the cutting unit moves away from its corresponding corner of the grass basket. But in both cases, and across the entire width of the cutting unit, a seal is maintained between the grass basket and the cutting unit such that no grass clipping can fall to the turf.

FIG. 7A shows the relative positions of the cutting unit and the grass basket when the cutting unit is on generally level ground. FIG. 7B shows the relative position between these components when the cutting unit is raised off of the turf. As can be seen, flap 110 simply slides along the front surface of front shield 40 to permit this relative motion.

FIGS. 6, 7A and 7B illustrate a particularly advantageous aspect of the present invention. FIG. 6 shows, in phantom, an intermediate position for the cutting unit, between the lowered, operating position (see FIG. 2) and the raised, transport position shown in solid line in FIG. 6. Seal 110 maintains contact with shield 40 in all three positions, keeping the seal between the cutting unit 20 and the grass catcher 46. During the lifting operation, cutting unit 20 is initially raised, to the intermediate position, until such time as cross tube 32 strikes carrier frame portion 72. This causes carrier frame 70 to also begin to rise. Eventually the fully raised, transport position is reached, as shown in solid line in FIG. 6. At all times, the grass seal is maintained.

Preferred embodiments of the invention are described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereto.

We claim:

1. A turf mower comprising:
    (a) a traction vehicle;
    (b) a reel-type cutting unit;
    (c) a cutting unit suspension system operatively connected to the traction vehicle and the cutting unit, wherein the suspension system permits at least yawing of the cutting unit relative to the traction vehicle;

(d) a grass catcher supported by the cutting unit suspension system, the grass catcher forming a mouth having a lower edge; and (e) a flexible seal member in operative contact with the cutting unit and the lower edge of the grass catcher mouth, wherein the flexible seal member flexes to accommodate yawing of the cutting unit by maintaining contact with the cutting unit and the grass catcher regardless of the extent to which the cutting unit yaws.

2. A turf mower having a cutting mode comprising:

(a) a traction vehicle;

(b) a reel-type cutting unit supported by a rear roller and a front roller and comprising a reel having a centerline; and (c) a cutting unit suspension system connected to the traction vehicle and comprising a single cutting unit joint located forward of the front roller and below the reel centerline, wherein the cutting unit joint constitutes the sole load-carrying connection between the cutting unit suspension system and the cutting unit when the turf mower is in its cutting mode, and wherein the cutting unit joint permits rolling, yawing and pitching of the cutting unit relative to the cutting unit suspension system.

3. The turf mower of claim 2, wherein the cutting unit joint is located generally at the same height as the rollers.

4. The turf mower of claim 3, wherein the joint is omnidirectional, permitting pitching, rolling and yawing of the cutting unit.

5. The turf mower of claim 4, wherein the cutting unit joint is a ball joint.

6. A turf mower comprising:

(a) a traction vehicle;

(b) a reel-type cutting unit;

(c) a cutting unit suspension system operatively connected to the traction vehicle and the cutting unit, wherein the suspension system permits at least yawing of the cutting unit relative to the traction vehicle;

(d) a grass catcher supported by the cutting unit suspension system, the grass catcher forming a mouth having a lower edge; and (e) a flexible seal member operatively connected to the grass catcher proximate to the lower edge of the grass catcher mouth, and operatively bearing against the cutting unit, wherein the flexible seal member flexes to accommodate yawing of the cutting unit by maintaining contact with the cutting unit and the grass catcher regardless of the extent to which the cutting unit yaws.

7. The turf mower of claim 6, wherein the seal member is fixed to the grass catcher and not fixed to the cutting unit.

8. The turf mower of claim 7, wherein the seal member comprises a flexible elastomeric flap which is connected to the mouth lower edge and which springingly and slidingly bears against the cutting unit.

9. The turf mower of claim 8, wherein the cutting unit comprises a front shield, and wherein the flap bears against the front shield.

10. The turf mower of claim 9, wherein (i) the cutting unit suspension system comprises a lift arm pivotally connected to the traction vehicle and a cutting unit carrier frame pivotally connected to the traction vehicle; (ii) the cutting unit comprises a lift arm receiving device; and (iii) when the cutting unit is lifted by means of the lift arm engaging the lift arm receiving device, the cutting unit is lifted independently of the grass catcher, and the flap accommodates this relative motion by sliding along the cutting unit front shield.

11. A turf mower for mowing turf in a mowing mode comprising:

(a) a traction vehicle;

(b) a reel-type cutting unit supported by a rear cutting unit roller and a front cutting unit roller which continuously engage the turf when the turf mower is in its mowing mode; and (c) a cutting unit carrier frame pivotally connected to the traction vehicle and connected to the cutting unit by means of a joint member that permits substantially free floating of the cutting unit relative to the carrier frame and the traction vehicle, wherein (i) the carrier frame comprises an anti-scalping device proximate the forward end thereof; (ii) the carrier frame carries a grass catcher; (iii) the anti-scalping device is spaced above the turf by a predetermined carrier frame ground clearance; and (iv) the traction vehicle bears substantially all of the weight of the carrier frame including the weight of the grass catcher, whereby the turf is not matted by the weight of the carrier frame and the grass catcher prior to encountering the cutting unit.

12. The turf mower of claim 11, wherein the anti-scalping device is a carrier frame roller.

13. The turf mower of claim 11, wherein the cutting unit carrier frame can be adjusted to alter the carrier frame ground clearance.

* * * * *